United States Patent
Park et al.

(10) Patent No.: US 7,206,487 B2
(45) Date of Patent: Apr. 17, 2007

(54) WAVEGUIDE PHOTODETECTOR

(75) Inventors: Jeong Woo Park, Daejeon (KR); Hyun Sung Ko, Daejeon (KR); Eun Deok Sim, Daejeon (KR); Yong Soon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/150,981

(22) Filed: Jun. 13, 2005

(65) Prior Publication Data

US 2006/0110113 A1    May 25, 2006

(30) Foreign Application Priority Data

Nov. 25, 2004    (KR) ................. 10-2004-0097644

(51) Int. Cl.
*G02B 6/10* (2006.01)
(52) U.S. Cl. .................... 385/129; 385/131
(58) Field of Classification Search .............. 385/12, 385/14, 131
See application file for complete search history.

(56) References Cited

U.S. PATENT DOCUMENTS

| | | | |
|---|---|---|---|
| 5,054,871 A * | 10/1991 | Deri et al. ............. 385/30 |
| 5,991,473 A * | 11/1999 | Nishikata et al. ...... 385/131 |
| 6,177,686 B1 | 1/2001 | Gutierrez-Aitken |
| 6,278,820 B1 | 8/2001 | Hayes |
| 6,330,378 B1 * | 12/2001 | Forrest et al. ............. 385/14 |
| 6,917,032 B2 * | 7/2005 | Fukano ................ 250/214.1 |
| 7,010,208 B1 * | 3/2006 | Gunn et al. ............ 385/131 |
| 2003/0053789 A1 * | 3/2003 | Marsh et al. ............ 385/141 |
| 2003/0173576 A1 | 9/2003 | Lam et al. |
| 2003/0235225 A1 * | 12/2003 | Glew et al. ............. 372/46 |
| 2004/0067023 A1 * | 4/2004 | Hanashima et al. ...... 385/43 |

FOREIGN PATENT DOCUMENTS

JP        060151944        5/1994

OTHER PUBLICATIONS

"Long-Wavelength Photoiodes for Optical Subscriber Networks", Funabashi et al. Furukawa Review, No. 18 1999, pp. 67-72.
"A Hugh-Efficiency 50 GHz InGaAs Multimode Waveguide Photodetetor", Kato et al., IEEE Journal of Quantum Electronics, vol. 28 No. 12 Dec. 1992, pp. 2728-2735.

* cited by examiner

*Primary Examiner*—Michelle Connelly-Cushwa
(74) *Attorney, Agent, or Firm*—Ladas & Parry LLP

(57) ABSTRACT

Provided is a waveguide photodetector including: a first clad layer disposed on a substrate; a core layer disposed on the first clad layer and for absorbing predetermined light; a second clad layer disposed on the core layer; and at least one subsidiary layer inserted in the first clad layer and the second clad layer. In this structure, the photodetector has about the same spot size as that of an optical fiber or planar lightwave circuit (PLC), so that incident light can be absorbed without loss, and the photodetector can more efficiently combine with the optical fiber or PLC and operate even at high power.

11 Claims, 2 Drawing Sheets

WAVEGUIDE PHOTODETECTOR

CROSS-REFERENCE TO RELATED APPLICATION

This application claims priority to and the benefit of Korean Patent Application No. 2004-97644, filed Nov. 25, 2004, the disclosure of which is incorporated herein by reference in its entirety.

BACKGROUND

1. Field of the Invention

The present invention relates to a waveguide photodetector and, more specifically, to a waveguide photodetector that can efficiently couple with an optical fiber or planar lightwave circuit (PLC) and operate even at high input power.

2. Discussion of Related Art

In general, a photodetector converts optical signals into electric signals. This photodetector is typically formed of semiconductor materials, and different semiconductor materials are used for different purposes.

When the photodetector is formed of a semiconductor material, a semiconductor absorbing layer absorbs light to generate electrons and holes. The generated electrons and holes are transported to respective electrodes, thus producing electric signals.

For example, when a PIN diode photodetector is reverse biased, generated electrons are transported to an n-electrode, and generated holes are transported to a p-electrode. The operating speed of a PIN diode depends on a transit time, which refers to a time taken for generated charges to move to respective electrodes, and an RC effect, which is related with the capacitance and load resistance of the PIN diode.

That is, in order to operate the PIN diode at high speed, the transit time should be shortened and the capacitance of the PIN diode should be reduced. The transit time can be shortened by reducing the thickness of an absorbing layer, but a reduction in the thickness of the absorbing layer leads to an increase in the capacitance of the PIN diode. Accordingly, the absorbing layer should be formed to an appropriate thickness according to its purpose.

Further, considering efficient integration with an optical device such as a planar lightwave circuit (PLC), a waveguide photodetector should be adopted. This waveguide photodetector can operate faster than a conventional surface-illumination photodetector. Because of these advantages, side-illumination waveguide photodetectors have widely been developed.

The efficiency of the waveguide photodetector is significantly affected by its capability of efficiently coupling with an optical fiber or PLC. In general, the beam size of light produced from the optical fiber or PLC is about 7 to 10 μm in diameter. On the other hand, it is difficult to obtain a semiconductor waveguide that can efficiently guide light having such a large beam size of about 7 to 10 μm.

To overcome this drawback, a multimode waveguide photodetector is disclosed in "A High Efficiency 50 GHz InGaAs Multimode Waveguide Photodetector" [IEEE J. of Quantum Electronics, vol. 28, No. 12, pp. 2728–2735, 1992].

In the multimode waveguide photodetector, incident light is not confined in only an InGaAs absorbing layer but also spreads over a p-InGaAsP layer and an n-InGaAsP layer, which constitute a separate confinement heterostructure (SCH) on both sides of the absorbing layer. Thus, the multimode waveguide photodetector can detect light while guiding light having a large spot size.

However, since the InGaAs absorbing layer has a great thickness, a large amount of incident light is confined in the InGaAs absorbing layer. Thus, when high-power light is absorbed in the InGaAs absorbing layer, excessive electrons and holes are generated. As a result, a voltage applied to the photodetector drops, thereby slowing down the operating speed of the photodetector. In other words, when high-power light is incident on the InGaAs absorbing layer, the operating speed of the photodetector is reduced.

Meanwhile, a waveguide photodetector, which operates at high speed even at high power, is disclosed in U.S. Pat. No. 6,278,820 B1. In the waveguide photodetector, a core layer is disposed under an absorbing layer. Also, a large amount of light is guided by the core layer, while a slight amount of light is incident on the absorbing layer. Thus, even if high-power light is incident on the photodetector, the absorbing layer generates electrons and holes in small amounts.

As a result, the photodetector disclosed in U.S. Pat. No. 6,278,820 B1 can prevent the slowdown of the photodetector at high power and can guide light having a great spot size only by slight etching.

However, when the photodetector disclosed in U.S. Pat. No. 6,278,820 B1 combines with a PLC, the absorbing layer and an intermediate layer constitute an integral waveguide together with the core layer of a main waveguide. As a result, the central axis of a waveguide mode deviates from the center of the core layer. Therefore, it is difficult to exactly find the central axis of the waveguide mode.

SUMMARY OF THE INVENTION

The present invention is directed to a waveguide photodetector in which a thin absorbing layer is disposed as a core layer to efficiently absorb light produced from an optical fiber or planar lightwave circuit (PLC), which has a large beam, size, and at least one subsidiary layer is inserted between thick clad layers. As a result, the waveguide mode of the photodetector can be enlarged, and the photodetector can more efficiently couple with the optical fiber or PLC and operate even at high power.

One aspect of the present invention is to provide a waveguide photodetector including: a first clad layer disposed on a substrate; a core layer disposed on the first clad layer and for absorbing predetermined light; a second clad layer disposed on the core layer; and at least one subsidiary layer inserted in the first clad layer and the second clad layer.

The core layer may be formed to a thickness of about 0.01 to 0.3 μm.

The thickness of the core layer may depend on a desired absorption rate per unit length.

The refractive index of the subsidiary layer may be higher than the refractive indexes of the first and second clad layers.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

Figure 1:
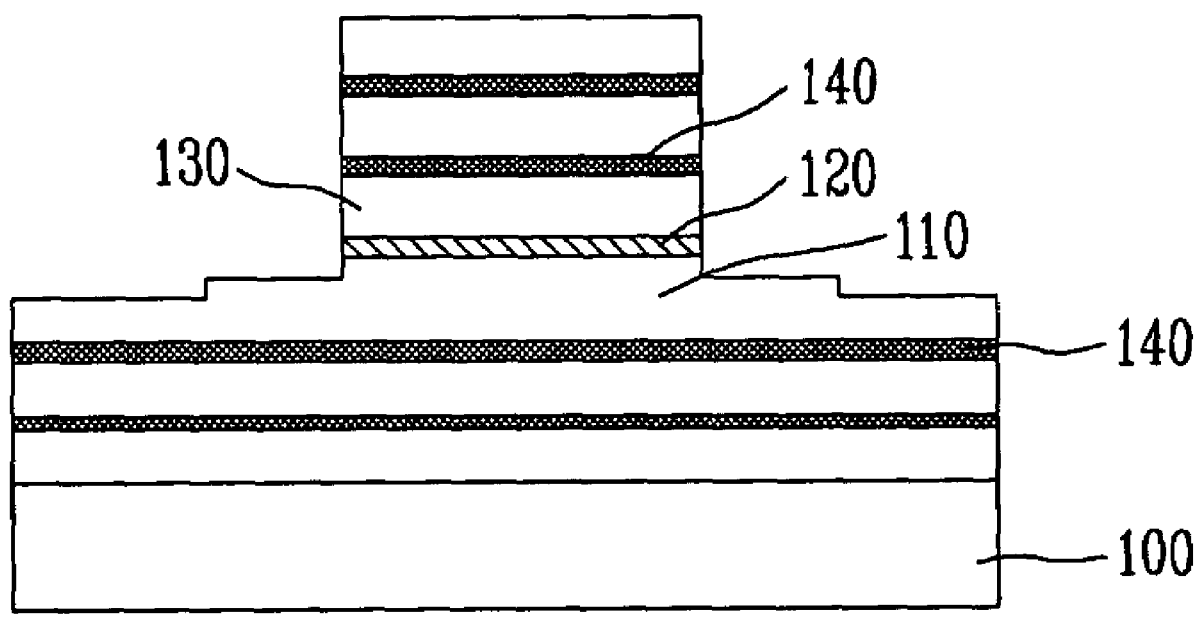
FIG. 1 is a cross sectional view of a waveguide photodetector according to an exemplary embodiment of the present invention.

FIG. 1 is a cross sectional view of a waveguide photodetector according to an exemplary embodiment of the present invention.

Referring to FIG. 1, the waveguide photodetector according to the exemplary embodiment of the present invention includes a substrate 100, a first clad layer 110, a core layer 120, a second clad layer 130, and at least one subsidiary layer 140.

The first clad layer 110 is disposed on the substrate 100, and the core layer 120, which functions as an absorbing layer for absorbing predetermined light, is disposed on the first clad layer 110.

The core layer 120 may be formed to a thickness of about 0.01 to 0.3 μm, and the thickness of the core layer 120 may depend on a desired absorption rate per unit length.

Typically, if the core layer 120 is formed to a small thickness, guided light spreads over a wide range. A method of increasing the spread of optical intensity by thinning out a core layer of an optical waveguide is generally employed for a spot size converter of a laser diode (LD). In this method, the beam size of guided light can be increased to about 3 to 4 μm in thickness.

The second clad layer 130 is disposed on the core layer 120.

At least one subsidiary layer 140 is inserted in the first clad layer 110 and the second clad layer 130.

In this case, the refractive index of the subsidiary layer 140 may be higher than the refractive indexes of the first and second clad layers 110 and 130.

Also, the subsidiary layer 140 may include a plurality of InGaAsP layers, which are spaced a predetermined distance apart from each other.

By inserting the subsidiary layer 140, the beam size of guided light can be increased up to about 7 to 10 μm.

Figure 2A:
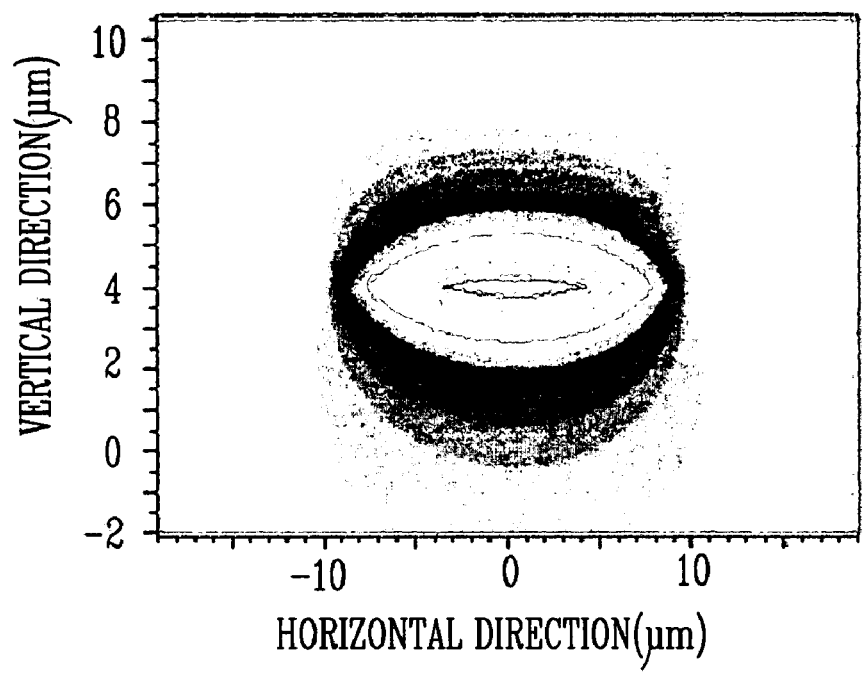
FIGS. 2A and 2B are graphs showing results of a comparison between a conventional photodetector and a waveguide photodetector according to an exemplary embodiment of the present invention.
Figure 2B:
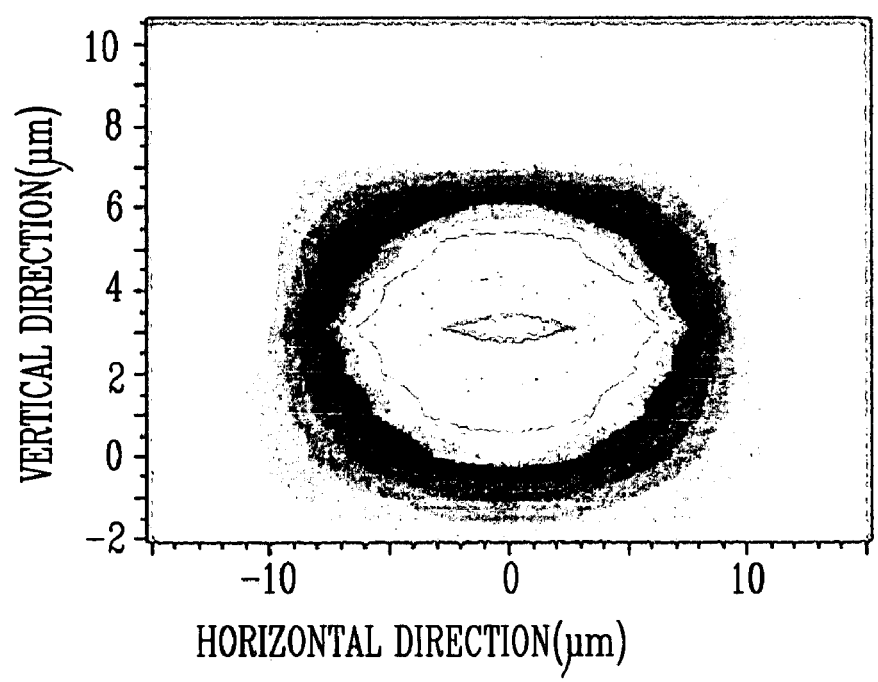

FIGS. 2A and 2B are graphs showing results of a comparison between a conventional photodetector and a waveguide photodetector according to an exemplary embodiment of the present invention.

Specifically, FIG. 2A shows a spot size of the conventional photodetector, which includes an InGaAs core layer of about 300 Å thickness and upper and lower InP clad layers, each of about 4 μm thickness.

Also, FIG. 2B shows a spot size of the waveguide photodetector according to the present invention, which has the same structure as the above-described conventional photodetector except that three subsidiary layers (140 of FIG. 1), each of which is formed of InGaAsP ($\lambda g=1.4$ μm) to a thickness of about 300 Å, are inserted between the upper and lower clad layers at about 1-μm intervals.

As can be seen from FIGS. 2A and 2B, the spot size of the photodetector can be expanded by inserting the subsidiary layers 140. As the spot size (i.e., beam size) of the photodetector increases, the photodetector can efficiently couple with an optical fiber or PLC having a large beam size.

As described above, in the waveguide photodetector according to the present invention, a waveguide layer is formed to a small thickness so that light is absorbed more slowly. That is, once the waveguide layer absorbs light, generated electrons and holes are spatially separated from each other, and a electric potential is generated between the electrons and holes, thus dropping a electric potential applied to the photodetector. As a result, the electrons and holes are transported more slowly, so that the operating speed of the photodetector is reduced. As optical intensity is increased, this effect also becomes strongly marked.

Therefore, in the present invention, because a thin absorbing layer is formed as a core layer and absorbs light slowly, the foregoing effect is greatly suppressed. Thus, the photodetector of the present invention can operate at high speed even at high input power.

As described above, according to the waveguide photodetector of the present invention, a thin absorbing layer is disposed as a core layer in order to efficiently absorb light produced from an optical fiber or PLC having a large beam size, and at least one subsidiary layer inserted between thick clad layers. As a result, the photodetector can have about the same spot size as that of the optical fiber or PLC, so that incident light can be absorbed without loss, and the photodetector can more efficiently combine with the optical fiber or PLC and operate even at high power as described above.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. A waveguide photodetector comprising:
a first clad layer disposed on a substrate;
a core layer of a small thickness disposed on the first clad layer capable of absorbing a light beam size of up to 4 μm and;
a second clad layer disposed on the core layer; and
at least one subsidiary layer having a predetermined thickness is inserted in each of the first clad layer and the second clad layer,
wherein the at least one subsidiary layer in each of the first and second clad layers is placed at a predetermined position inside the respective one of the first or second clad layers such that the at least one subsidiary layer allows absorption of a light beam size up to 10 μm, and
wherein the at least one subsidiary layer in each of the first and second clad layers is formed of material different from the material of the respective first or second clad layer and has a higher refractive index than the refractive index of the respective first or second clad layer.

2. The waveguide photodetector according to claim 1, wherein the core layer is formed to a thickness of about 0.01 to 0.3 μm.

3. The waveguide photodetector according to claim 1, wherein the thickness of the core layer depends on a desired absorption rate per unit length.

4. The waveguide photodetector according to claim 1, wherein the refractive index of the subsidiary layer in the first or second clad layer is higher than the refractive index of the corresponding one of the first and second clad layers.

5. The waveguide photodetector according to claim 1, wherein the subsidiary layer in the first or second clad layer is formed of an lnGaAsP layer.

6. The waveguide photodetector according to claim 1, wherein the subsidiary layer includes a plurality of layers, which are spaced a predetermined distance from each other.

7. The waveguide photodetector according to claim 1, wherein three subsidiary layers, each of which is formed of lnGaAsP to a thickness of about 300 Å are inserted in each of the first and second clad layers at about 1 µm interval.

8. A waveguide photodetector comprising:
 a first clad layer disposed on a substrate, wherein three subsidiary layers, each of which is formed of lnGsAsP to a thickness of about 300 Å are inserted in the first clad layer at about 1 µm interval;
 a core layer disposed on the first clad layer to absorb predetermined light;
 a second clad layer disposed on the core layer, wherein three subsidiary layers, each of which is formed of lnGaAsP to a thickness of about 300 Å are inserted in the second clad layer at about 1 µm interval.

9. The waveguide photodetector according to claim 8, wherein the core layer is formed to a thickness of about 0.01 to 0.3 µm.

10. The waveguide photodetector according to claim 8, wherein the thickness of the core layer depends on a desired absorption rate per unit length.

11. The waveguide photodetector according to claim 8, wherein the refractive index of the subsidiary layer in the first or second clad layer is higher than the refractive index of the corresponding one of the first and second clad layers having the subsidiary layer.

\* \* \* \* \*